United States Patent [19]

Smith, Jr.

[11] Patent Number: 5,016,987
[45] Date of Patent: May 21, 1991

[54] LIQUID CRYSTAL CELL SEALANT ASSEMBLY

[75] Inventor: Willis H. Smith, Jr., Newbury Park, Calif.

[73] Assignee: Hughes Aircraft Company, Los Angeles, Calif.

[21] Appl. No.: 533,548

[22] Filed: Jun. 5, 1990

[51] Int. Cl.$^5$ ................................................. G02F 1/13
[52] U.S. Cl. ..................................... 350/344; 350/334; 350/343
[58] Field of Search ................................ 350/344, 343

[56] References Cited

U.S. PATENT DOCUMENTS 4,575,190 3/1986 Wood et al. ................... 350/344 X
4,712,875 12/1987 Tsuboyama et al. ................ 350/344

FOREIGN PATENT DOCUMENTS 0039871 5/1981 France .
53-91763 8/1978 Japan .
56-162716 12/1981 Japan .
61-7824 1/1986 Japan .

OTHER PUBLICATIONS

Efron et al., "The Silicon Liquid–Crystal Light Valve", Journal of Applied Physics, vol. 57, No. 4, Feb. 15, 1985, pp. 1356–1368.

Primary Examiner—Stanley D. Miller
Assistant Examiner—Ron Trice
Attorney, Agent, or Firm—V. D. Duraiswamy; W. K. Denson-Low

[57] ABSTRACT

Active components of a liquid crystal light valve are provided on opposed faces of a pair of transparent substrates that have peripheral edges which flare out and away from the opposed faces at predetermined angles. A sealant ring formed from a stiffly resilient material encircles the substrates to seal the space between their opposed faces. The inner surface of the ring has a chevron profile with angles complementary to the substrate edge angles, and an unstressed inner diameter slightly smaller than the corresponding outer diameters of the substrates. The sealant ring is thus slightly deformed outwardly as the substrates are tightened together to a desired spacing, producing a hermetic seal for the active light valve elements.

19 Claims, 3 Drawing Sheets

LIQUID CRYSTAL CELL SEALANT ASSEMBLY

BACKGROUND OF THE INVENTION

1. Field of the Invention

This invention relates to liquid crystal cells, and more particularly to assemblies for holding the various components of a liquid crystal light valve together.

2. Description of the Related Art

The liquid crystal light valve (LCLV) is an optical image transducer capable of accepting a low-intensity light image and converting it, in real time, into an output image with light from another source. A general description of LCLVs is presented in Efron et al., "The Silicon Liquid-Crystal Light Valve", *Journal of Applied Physics*, Vol. 57, No. 4, Feb. 15, 1985, pages 1356–1368. LCLVs can be constructed to accept either visible or infrared input images, and can also operate from a direct electrical input through a charge coupled device (CCD) interface.

A generic LCLV is shown in FIG. 1. The device consists of a CdS or silicon photoconductor layer 10 and a nematic (normally transparent) liquid crystal layer 12 separated from the photoconductor 10 by a dielectric mirror 14 and a light blocking layer 16. The photoconductor layer 10 acts as an imaging, light-controlled voltage modulator for the liquid crystal layer 12. The broad-spectral band dielectric mirror 14 serves to reflect a modulated readout beam 18, while the light-blocking layer 16 prevents residual readout light from reaching the photoconductor layer 10. In response to an input light pattern 20, the impedance of photoconductor layer 10 lowers in proportion to the input light intensity at any particular spatial location. A voltage is applied across the assembly by means of a bias voltage source 22 connected to a transparent conductive electrode 24 and a transparent conductive counterelectrode 26, typically constructed from indium tin oxide (ITO). This voltage is switched to the liquid crystal layer 12 in proportion to the spatial reduction in impedance in photoconductor layer 10; the liquid crystal layer 12 and photoconductor 10 in essence act as a spatial voltage divider between the two electrodes. The application of the voltage pattern modulates the liquid crystal layer 12 to drive it above its electro-optic threshold in a pattern that replicates the input image intensity. Typical operating voltage levels are 10 volts rms at 10 kHz.

The LCLV assembly further includes transparent substrate face plates 28 and 30 for receiving the input and readout beams, respectively. Face plates 28 and 30 are constructed of optical glass flats or fiber optics, and sandwich the liquid crystal and associated light valve layers therebetween to provide coupling between input and output light.

The dimensions of the various LCLV components in FIG. 1 are greatly distorted for ease of illustration. In practice, the cumulative width of liquid crystal layer 12, dielectric mirror 14, light-blocking layer 16, photoconductor layer 10 and electrodes 24, 26 is much less than the widths of face plates 28,30.

A conventional mounting assembly for an LCLV is shown in cross-section in FIG. 2. The lower glass substrate 28 is supported in a well in an annular base 32, while the upper substrate 30 sits in a similar well in an annular retainer cap 34. The active elements of the LCLV are not shown individually since they are so much thinner than the glass substrates 28,30, but rather are indicated collectively by line 36.

The retainer cap 34 has a depending peripheral flange 38 that extends down to a level near the upper surface of base 32. The base and retainer cap are held together, clamping the glass substrates 28,30 and the active LCLV elements therebetween, by a number of bolts (not shown) that extend vertically through the depending cap flange 38 and the base 32.

The electrode 24, photoconductor 10, light-blocking layer 16 and dielectric mirror 14 of FIG. 1 are adhered to the upper surface of input face plate 28, while the counterelectrode 26 is adhered to the opposing lower face of the readout face plate 30, with the liquid crystal inbetween. Electrical leads 40 extend through an opening in the depending cap flange 38 to contact the LCLV electrode and counterelectrode, and are held in place by a retaining nut 42.

Four O-ring seals are required in the above structure. The first O-ring 44 is retained in a groove that extends around an inner upstanding flange 46 on base 32, to seal the space between the base 32 and retainer cap 34. Second and third O-rings 48 and 50 seal the abutment of base 32 and retainer cap 34 against shoulders on their corresponding face plates 28 and 30, while a fourth O-ring 52 seals the entrance for electrical lead 40.

A significant limitation of the above LCLV assembly is that it is not hermetically sealed, and requires a large inner cavity 54 to accommodate relative movement between the base and retainer cap. Oxygen can become trapped in the cavity and react with the liquid crystal, eventually destroying it.

An encapsulation technique that has been used in some liquid crystal applications, such as watches and calculators, uses a back-fill technique in which a small hole is formed in one of the substrates of a liquid crystal cell. The substrates are sealed together by a UV-cured epoxy with a space between them, and then subjected to a vacuum. Upon dipping the hole into liquid crystal and exposing the structure to atmospheric pressure, the liquid crystal is drawn through the hole to back-fill the space between the two substrates.

While this back-fill approach could be applicable to LCLVs, it has several important limitations. First, the space reserved for the liquid crystal is not adjustable. In an LCLV an ability to tune the thickness of the liquid crystal layer and thereby accommodate different readout wavelengths or correct for spacing errors, is highly desirable. Second, once the assembly has been completed it cannot be easily disassembled in case of a bad electrode. The expensive light valve substrates have to be forfeit along with the relatively inexpensive electrodes to disassemble the device. Third, some of the liquid crystal components tend to vaporize in a vacuum, so that the liquid crystal within the completed assembly may not have the same characteristics as it did before being subjected to a vacuum during the assembly process.

SUMMARY OF THE INVENTION

The present invention seeks to provide an LCLV assembly which is hermetically sealed and can achieve a longer life because it is not subject to oxidation of the liquid crystal, has fewer parts than prior LCLV assemblies, has a tuneable liquid crystal thickness, can be disassembled to have the substrates in the event of a bad electrode, and in which the liquid crystal does not have to be subjected to a vacuum during assembly.

The invention provides a new LCLV assembly in which the peripheral edges of the transparent face plates flare outward and away from the opposed faces of the face plates. A sealant ring formed from a stiffly resilient material encircles the substrates to seal the space between their opposed faces. The inner surface of the sealant ring has a chevron profile which faces the substrates, and includes chevron angles that are complementary to the substrate edge angles. The unstressed inner diameter of the sealant ring is slightly smaller than the corresponding outer diameters of the substrates, so that the sealant ring bears against the substrates and is slightly deformed outwardly when the substrates are inserted, forming a hermetic seal. The liquid crystal layer and other light valve elements are protected between the face plates.

In a preferred embodiment the substrate edge angles are in the approximate range of 5°-20°, and preferably about 10°. The ratio of the substrate diameter at their opposed faces to the minimum sealant ring inner diameter is preferably within the approximate range of 1.01-1.03. To collect excess liquid crystal, the sealant ring can include an annular reservoir around its inner apex.

These and other features and advantages of the invention will be apparent to those skilled in the art from the following detailed description, taken together with, the accompanying drawings, in which:

DETAILED DESCRIPTION OF THE INVENTION

Figure 1:
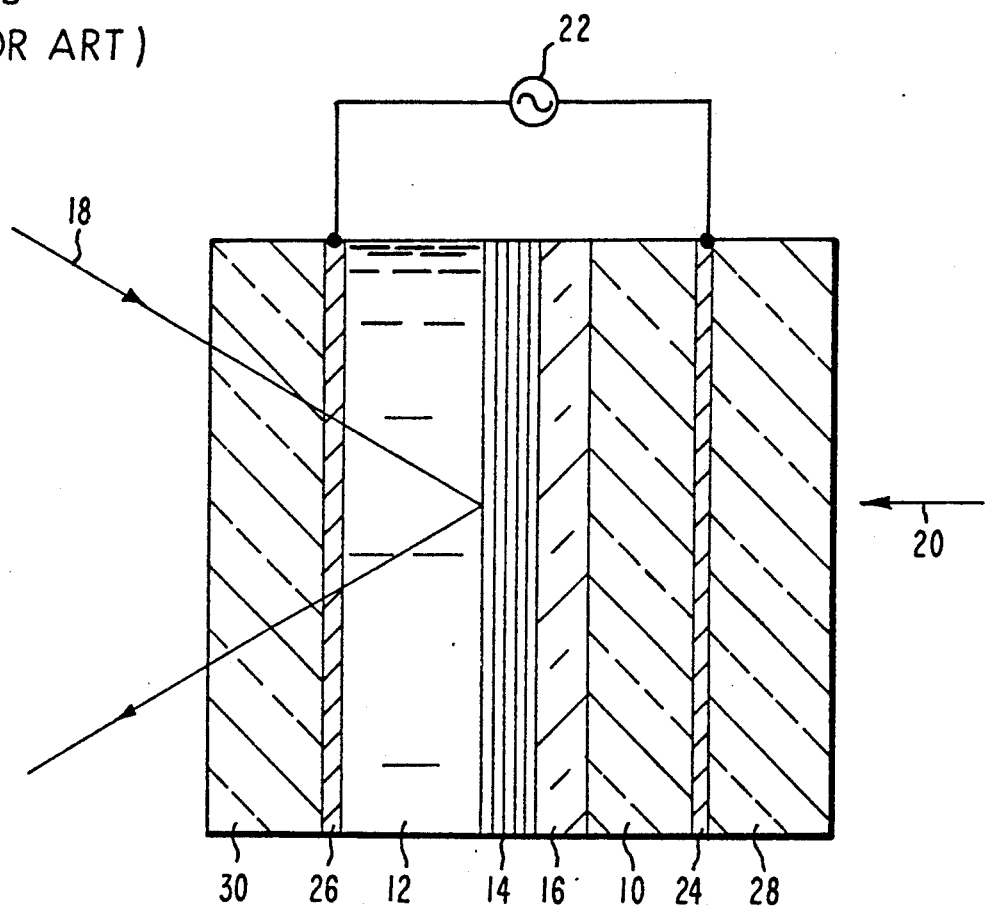
FIG. 1 is a unscaled sectional view illustrating the functional elements of an LCLV, described above.
Figure 2:
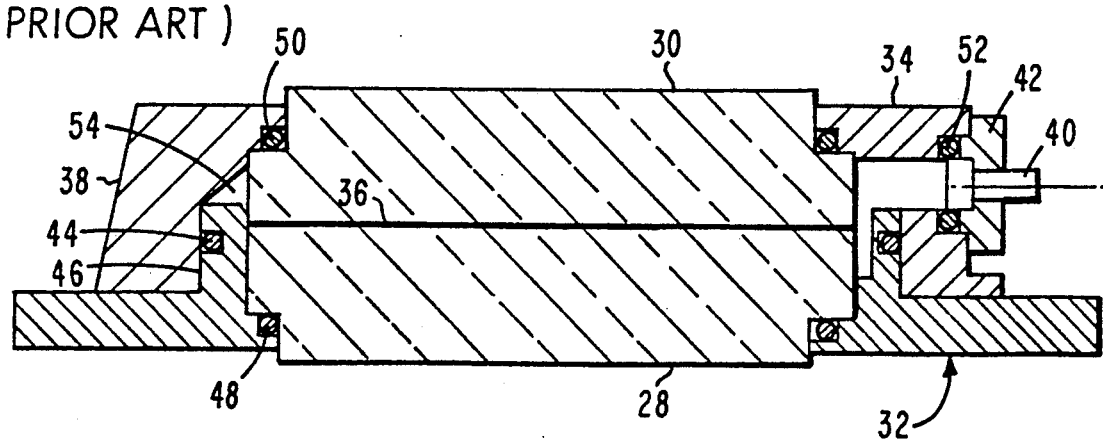
FIG. 2 is a sectional view of a prior LCLV assembly, described above.
Figure 3:
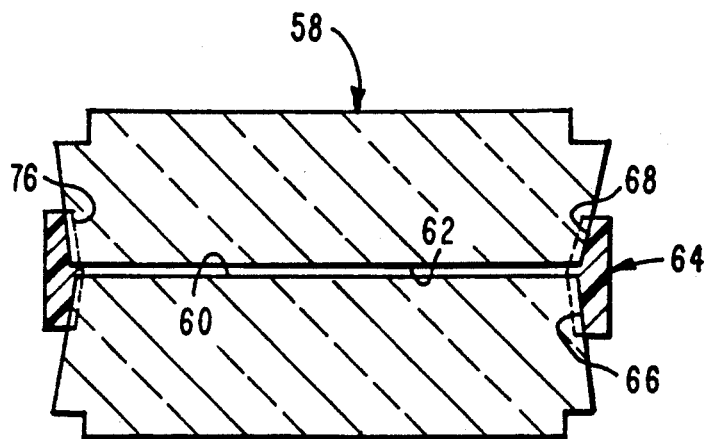
FIG. 3 is a sectional view showing the sealing mechanism employed in the present invention.
Figure 4:
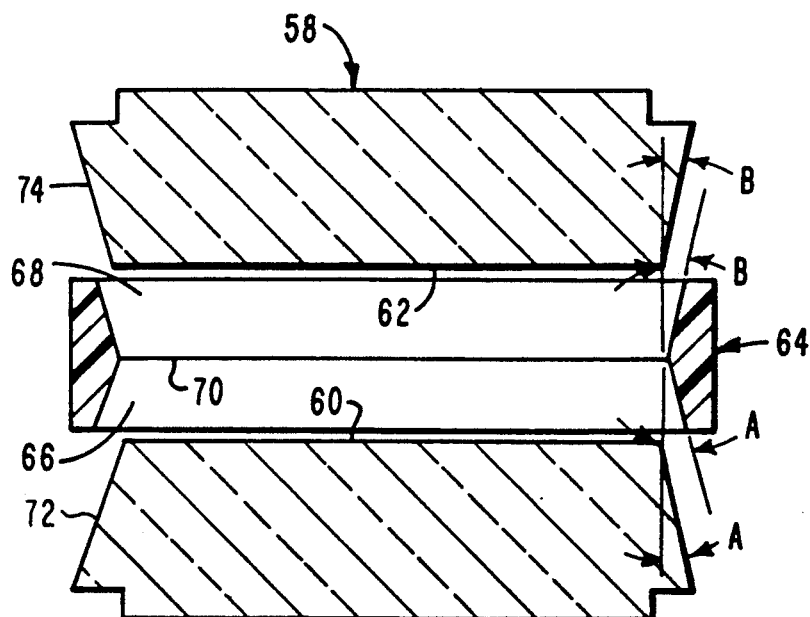
FIG. 4 is an exploded view of the device shown in FIG. 3.

Referring to FIGS. 3 and 4, the basic components of the new LCLV sealant assembly are shown. As with the prior approach illustrated in FIG. 2, the active LCLV elements are positioned between a pair of transparent face plate substrates 56,58. The substrates would typically be formed from a quartz-type glass composition such as BK7A, but no limitation to any particular substrate material is intended. The active light valve elements are not shown because of their very small thicknesses compared to the substrates 56,58, but they would generally include elements comparable to those shown in FIG. 1. Numerous variations are also possible, as known in the light valve art. For example, dielectric mirror 14 could be replaced by a metal matrix mirror for certain applications, light-blocking layer 16 could be eliminated if the readout radiation is not at a frequency that would effect photoconductor layer 10, and the photoconductor might be formed from a material other than those described above.

The inner face 60 of transparent substrate 56 carries an electrode, photoconductor layer, light-blocking layer (if required) and mirror, while the opposed inner face 62 of substrate 58 carries a counterelectrode, as in the prior design of FIG. 2. However, the substrates are provided with a special sealant configuration that overcomes the liquid crystal oxidation problem encountered with the prior light valve assembly, and yet allows for disassembly of the components so that a faulty electrode may be removed without losing its associated substrate. At the same time a capability of finely tuning the thickness of the liquid crystal layer is retained.

A stiffly resilient annular seal member 64, in the general shape of a ring, is used to provide the seal. The inner surface of seal 64 has a generally chevron profile, with lower and upper inner side walls 66,68 converging to an apex 70. Side walls 66 and 68 are angled out and away from apex 70 at predetermined divergence angles A and B, respectively. Seal 64 may thus be viewed as comprising lower and upper sockets, one socket defined by lower inner wall 66 and the other by upper inner wall 68, with the seal open between the two sockets.

The peripheral edges 72,74 of substrates 56,58, respectively, flare outward and away from their respective substrate faces 60,62 at angles that are complementary to sealant ring inner wall angles A and B, respectively. In the preferred embodiment the two peripheral substrate edge angles are equal to each other, and are also equal to sealant ring chevron angles A and B.

The inner diameter of sealant ring 64 around apex 70 is slightly less than the outer diameters of the transparent substrates at their opposed faces 60,62. As a result, substrates 56 and 58 can be press fit into the sealant ring to a depth at which the inner portion of the stiffly resilient sealant ring material is slightly deformed outwardly. In this position the substrates are securely wedged within their respective sealant ring sockets, hermetically sealing the light valve space between the opposed substrate faces 60,62. This sealed position for the substrates is shown in FIG. 3, in which the original unstressed profile of the inner sealant ring surfaces is indicated by dashed line 76.

While the exact angles A,B for the inner seal and peripheral substrate walls will depend somewhat upon the particular materials used, these angles should preferably be within the approximate range of 5°-20°. Significantly smaller angles would make it more difficult to obtain a hermetic seal, while significantly larger angles would reduce the freedom of adjustment for the spacing between the opposed substrates. The appropriate sealant ring configuration can be obtained by molding, while a glass substrate with vertical edge walls can be modified by circular grinding to achieve the desired peripheral edge angle.

In a preferred embodiment, polytetrafluoroethylene (provided under the trademark Teflon by E. I. DuPont de Nemours and Co., Inc.) is used for the sealant ring 64, and the previously mentioned BK7A quartz-type glass composition for the transparent substrates 56,58. Other materials such as polychlorotrifluoroethylene, fiberglass-filled polytetrafluoroethylene, polyvinylfluoride and various rubber compositions might also be used for the sealant ring. The primary criteria for other materials would be that they have a thermal expansion coefficient similar to that of the substrates, a high temperature capability, and that they be stiffly elastic to accommodate a deformation during press fitting of the substrates to form a good seal. The coefficient of linear thermal expansion for the Teflon material is $99 \times 10^{-6}/°K$, while its tensile modulus is about $1 \times 10^4 KPa$. A Teflon sealant ring in which angle A=angle B=10.77° was used in a successful implementation of the invention.

Figure 5:
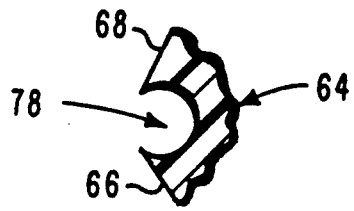
FIG. 5 is a fragmentary sectional view showing a reservoir in the sealant ring for collecting excess liquid crystal.

A modification of sealant ring 64 designed to accommodate an excess of liquid crystal within the LCLV is shown in FIG. 5, greatly enlarged. An annular reservoir 78 within the ring itself is formed in the apex 70, opening to the space between the two opposed substrates 56,58. As the substrates are pressed together, excess liquid crystals squeezed out from between them can be accommodated by the reservoir 78.

Figure 7:
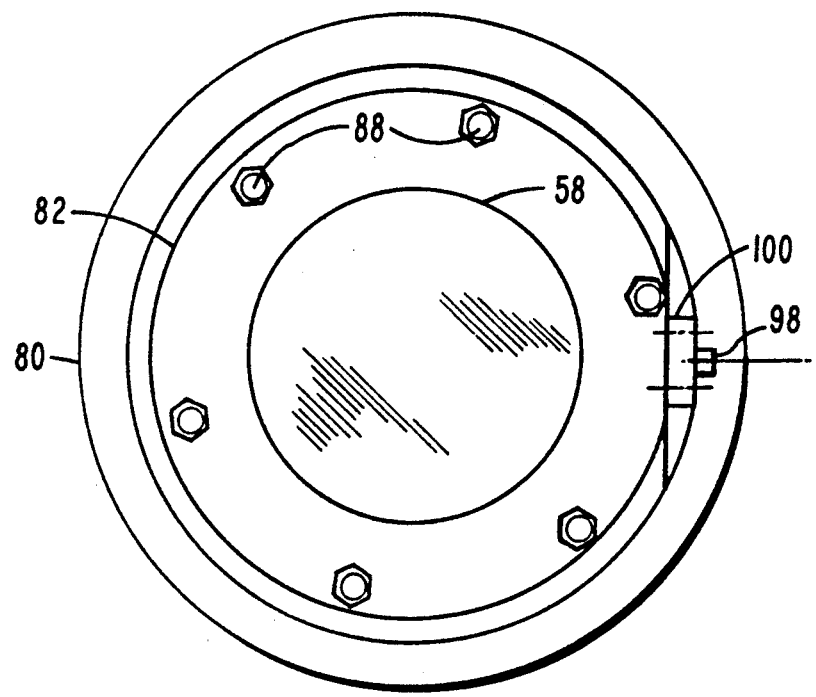
FIG. 7 is a plan view of the assembly shown in FIG. 6.
Figure 6:
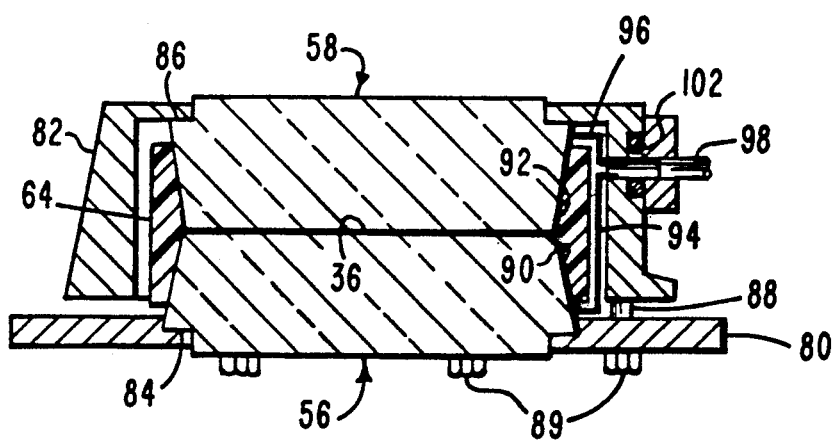
FIG. 6 is a sectional view of a completed LCLV assembly in accordance with the invention.

FIGS. 6 and 7 show a fully assembled LCLV, incorporating the transparent substrates 56,58 and sealant ring 64 of FIGS. 3 and 4. A clamping assembly includes a lower base 80 that engages the lower substrate 56, and an upper retainer cap 82 that engages the upper substrate 58. Substrate 56 extends partially through a central opening in base 80, with the base walls adjacent the opening engaging the peripheral substrate shoulder 84 to hold the substrate up. The upper substrate 58 extends partially through a similar opening in the cap 82, with the cap walls adjacent the opening engaging and bearing down upon the upper substrate peripheral shoulder 86.

A set of bolts 88 are spaced around the periphery of the cap 82, and extend down through the cap and into the base outside the area occupied by substrates 56,58 and sealant ring 64. Nuts 89 may be provided on the underside of base 80 to receive the bolts, or the bolt openings in base 80 may simply be threaded to retain the bolts. The bolts hold the base and cap together with the substrates 56,58 clamped between them. The bolts are rotated during assembly to force the substrates progressively further into their respective sealant ring sockets. A proper tightening of the bolts will bring the two substrates close enough together so that the space left for the liquid crystal layer between the two substrates has the desired dimension.

Electrical contact is made with the electrodes on the opposed faces of substrates 56,58 by means of conductive tabs 90,92 that extend along the peripheral edges of the substrates from their respective electrodes to the opposite end of the edge. The tabs are preferably formed by evaporated aluminum, and are so thin that they do not interfere with the hermetic seal between the substrates and sealant ring 64. Lead wires 94,96 are brought into the interior of the assembly through a conduit 98 that extends through an opening in cap 82. Lead wire 94 is attached to tab 90 on the lower substrate beyond the limit of sealant ring 64 by means of an indium bond, while lead wire 96 is attached to tab 92 on the upper substrate in a similar fashion. This mechanism for establishing electrical contacts to the electrodes is similar to that used previously in connection with the device shown in FIG. 2. A nut 100 holds conduit 98 in place, while with a single O-ring 102 provides a seal between the conduit and the cap opening through which it extends. This is the only O-ring used in the assembly, as opposed to the four O-rings required for the prior approach of FIG. 2.

In a particular implementation the substrate diameters were 2.115" along the electrode faces and 2.240" at the maximum, the substrates were 0.500" thick overall and 0.3305" thick between their shoulders and electrode faces, and the sealant ring was 0.540" thick with an apex diameter of 2.080" and a maximum inner diameter of 2.205". The ratio of the minimum substrate diameter to the minimum sealant ring diameter was thus about 1.017:1; for most materials a ratio of approximately 1.01-1.03 is preferred.

To assemble the LCLV, the sealant ring 64 is loosely placed over the lower substrate 56, that substrate is positioned in base 80, and a measured amount of liquid crystal is placed on the upper face of the substrate. The upper substrate 58 is then inserted into sealant ring 64 in a "scissors" fashion with its lower face initially at an angle to the lower substrate, and its upper end then pushed down until the two substrates are roughly parallel. The cap 82 is next placed over the upper substrate 58, and the bolts 88 tightened to draw the base 80 and cap 82 together, along with their captured substrates. As the two substrates approach each other and the spacing between them diminishes, the liquid crystal spreads out in a substantially uniform layer between the two substrates. Any excess liquid crystal is captured in the reservoir 78 shown in FIG. 5. The liquid crystal thickness at any given location can be determined in a conventional fashion by directing an optical beam through the upper substrate 58 so that the beam passes through the liquid crystal at that location, reflecting the beam off the dielectric or other mirror carried on the lower substrate 56, and analyzing the fringe pattern associated with the reflected beam. For very thin cells, with a liquid crystal layer on the order of 2 microns, the light valve assembly can be placed in a projector and the thickness of the liquid crystal layer tuned in accordance with its projected image. Conventional dielectric spacers would normally be positioned on the lower face of substrate 58 to prevent the opposed electrodes from contacting in case the assembly is over-tightened.

Tightening the bolts 88 to bring the liquid crystal layer to its desired thickness forces the substrates 56,58 to move further into sealant ring 64. As they press against the inner walls of the sealant ring, the ring expands slightly to conform to the shape of the substrate peripheral edges and mechanically seal the cell.

Subsequent disassembly of the LCLV is easily accomplished in case of a defective electrode, or if for some other reason it is desired to take the light valve apart. The cap 82 and base 80 are removed, leaving the substrates 56,58 extending beyond the lower and upper limits of the sealant ring 64. Since the substrates are tightly wedged into the sealant ring, they normally cannot be removed by hand. However, a pair of simple "clam shell" fixtures can be used to clamp the periphery of each substrate where it extends beyond the sealant ring, and pull the substrates out from the ring; the angled substrate edges enable the "clam shell" fixtures to securely grip the substrates. The electrodes or other active components of the light valve can then be replaced as desired, and the apparatus reassembled with the same substrates as before.

While several illustrative embodiments of the invention have been shown and described, numerous variations and alternate embodiments will occur to those skilled in the art. For example, while the invention has been described with reference to a LCLV, it may be applicable to other types of liquid crystal cells. Such variations and alternate embodiments are contemplated, and can be made without departing from the spirit and scope of the invention as defined in the appended claims.

I claim:

1. A liquid crystal light valve (LCLV) assembly, comprising:
   first and second transparent annular substrates having mutually opposed and spaced apart faces, and peripheral edges flaring outward and away from said opposed faces at predetermined angles,
   an annular sealant ring encircling said substrates and sealing the space between said opposed faces, said sealant ring being formed from a stiffly resilient material having an inner surface with a chevron profile facing said substrates and chevron angles complementary to said predetermined substrate edge angles, said sealant ring having an unstressed inner diameter slightly smaller than the corresponding outer diameters of said substrates so that said sealant ring bears against said substrates and is slightly deformed outwardly thereby to hermetically seal said space, and
   a liquid crystal layer and means for modulating said liquid crystal layer in response to a signal received through one of said substrates, said liquid crystal layer and modulating means located within said space between said opposed substrate faces.

2. The LCLV assembly of claim 1, wherein said predetermined substrate edge angles are in the approximate range of 5°-20°.

3. The LCLV assembly of claim 2, wherein said predetermined substrate edge angles are approximately 10°.

4. The LCLV assembly of claim 1, wherein the ratio of the substrate diameters at said opposed faces to the minimum sealant ring inner diameter is within the approximate range of 1.01-1.03.

5. The LCLV assembly of claim 1, the chevron profile of said sealant ring comprising a pair of angled annular surfaces converging to an apex area, said sealant ring including an annular reservoir formed in said apex area for collecting excess liquid crystal from the space between said substrates.

6. The LCLV assembly of claim 1, said sealant ring being formed from polytetrafluorethylene.

7. The LCLV assembly of claim 1, further comprising means for clamping said substrates with respect to each other, said clamping means being adjustable to adjust the space between said opposed substrate faces.

8. A liquid crystal cell, comprising:
   first and second transparent substrates having mutually opposed and spaced apart faces, and peripheral edges flaring outward and away from said opposed faces at predetermined angles,
   an annular sealant ring encircling said substrates and sealing the space between said opposed faces, said sealant ring being formed from a stiffly resilient material having an inner surface with a chevron profile facing said substrates and chevron angles complementary to said predetermined substrate edge angles, said sealant ring having an unstressed inner diameter slightly smaller than the corresponding outer diameters of said substrates so that said sealant ring bears against said substrates and is slightly deformed outwardly thereby to hermetically seal said space, and
   a liquid crystal layer and means for modulating said liquid crystal layer in response to a signal received through one of said substrates, said liquid crystal layer and modulating means located within said space between said opposed substrate faces.

9. The liquid crystal cell of claim 8, wherein said predetermined substrate edge angles are in the approximate range of 5°-20°.

10. The liquid crystal cell of claim 9, wherein said predetermined substrate edge angles are approximately 10°.

11. The liquid crystal cell of claim 8, wherein the ratio of the substrate diameters at said opposed faces to the minimum sealant ring inner diameter is within the approximate range of 1.01-1.03.

12. The liquid crystal cell of claim 8, the chevron profile of said sealant ring comprising a pair of angled annular surfaces converging to an apex area, said sealant ring including an annular reservoir formed in said apex area for collecting excess liquid crystal from the space between said substrates.

13. The liquid crystal cell of claim 8, said sealant ring being formed from polytetrafluorethylene.

14. The liquid crystal cell of claim 8, further comprising means for clamping said substrates with respect to each other, said clamping means being adjustable to adjust the space between said opposed substrate faces.

15. A sealant assembly for a liquid crystal cell, comprising:
   first and second transparent substrates having respective substantially flat faces and peripheral edges that extend from said faces at non-perpendicular, outward directed angles,
   a sealant ring formed from a stiffly resilient material and having first and second opposed sockets, the first socket having a receiver surface that is complementary to and slightly smaller than the peripheral edge of said first substrate, and the second socket having a receiver surface that is complementary to and slightly smaller than the peripheral edge of said second substrate, said sealant ring being open between said sockets, and
   means for press fitting said first and second substrates respectively into said first and second sockets to positions at which their respective flat faces are mutually opposed and spaced apart by an amount sufficient to accommodate a quantity of liquid crystal, and said substrates are wedged in their respective sockets sufficiently to slightly deform said sockets outwardly so that said sealant ring hermetically seals the space between said opposed substrate faces.

16. The liquid crystal cell sealant assembly of claim 15, wherein said substrate edge angles are in the approximate range of 5°-20° from perpendicular to their respective substrate faces.

17. The liquid crystal cell sealant assembly of claim 16, wherein said substrate edge angles are approximately 10° from perpendicular to their respective substrate faces.

18. The liquid crystal cell sealant assembly of claim 15, said sealant ring including a reservoir extending into its inner surface between said sockets for collecting excess liquid crystal from between said substrates.

19. The liquid crystal cell sealant assembly of claim 15, said sealant ring being formed from polytetrafluorethylene.

* * * * *